(12) United States Patent
Psenka et al.

(10) Patent No.: US 11,310,121 B2
(45) Date of Patent: Apr. 19, 2022

(54) SYSTEMS AND METHODS FOR ELECTRON FLOW RENDERING AND VISUALIZATION CORRECTION

(71) Applicant: Moovila, Inc., Mount Pleasant, SC (US)

(72) Inventors: Mike Psenka, Sullivan's Island, SC (US); Michael Peter Psenka, Sullivan's Island, SC (US)

(73) Assignee: Moovila, Inc., Mount Pleasant, SC (US)

( * ) Notice: Subject to any disclaimer, the term of this patent is extended or adjusted under 35 U.S.C. 154(b) by 164 days.

(21) Appl. No.: 16/102,832

(22) Filed: Aug. 14, 2018

(65) Prior Publication Data
US 2019/0068459 A1    Feb. 28, 2019

Related U.S. Application Data

(60) Provisional application No. 62/548,610, filed on Aug. 22, 2017.

(51) Int. Cl.
| | |
|---|---|
| *H04L 41/22* | (2022.01) |
| *G06T 11/20* | (2006.01) |
| *H04L 41/14* | (2022.01) |
| *H04L 41/12* | (2022.01) |

(52) U.S. Cl.
CPC ............ *H04L 41/22* (2013.01); *G06T 11/203* (2013.01); *G06T 11/206* (2013.01); *H04L 41/12* (2013.01); *H04L 41/14* (2013.01)

(58) Field of Classification Search
CPC ......... H04L 41/22; H04L 41/12; H04L 41/14; G06T 11/203; G06T 11/206
See application file for complete search history.

(56) References Cited

U.S. PATENT DOCUMENTS

| | | | | |
|---|---|---|---|---|
| 5,506,948 A | * | 4/1996 | Onitake | ................ G06T 11/203 345/619 |
| 5,619,632 A | * | 4/1997 | Lamping | ................ G06T 11/206 345/441 |

(Continued)

OTHER PUBLICATIONS

Data visualization—Wikipedia. Retrieved Aug. 2, 2018. (sixteen (16) pages).

*Primary Examiner* — Jeremy L Stanley
(74) *Attorney, Agent, or Firm* — Olive Law Group, PLLC

(57) ABSTRACT

Systems and methods for electron flow rendering and visualization correction are disclosed. According to an aspect, a method includes detecting two or more entities connected in a computing network. The method also includes acquiring data attributes from the entities connected to each other within the computing network. Further, the method includes rendering a graphical depiction of the entities connected to each other in the form of a graphical object and graphical line curvature. The method also includes generating a graphical line curvature correction scheme based on a relationship between the graphical line curvatures and graphical objects. Further, the method includes applying the graphical line curvature correction scheme to the acquired data attributes from the entities connected to each other in the form of graphical objects and graphical line curvatures to produce a corrected electron flow expression of the entities.

20 Claims, 11 Drawing Sheets

(56) References Cited

U.S. PATENT DOCUMENTS

| | | | | |
|---|---|---|---|---|
| 6,018,352 A * | 1/2000 | Saito | G06T 11/203 | 345/678 |
| 6,204,861 B1 * | 3/2001 | Chen | G06T 11/203 | 345/442 |
| 6,271,864 B1 * | 8/2001 | Graham | G06T 11/203 | 345/442 |
| 6,300,957 B1 * | 10/2001 | Rao | G06T 11/206 | 345/441 |
| 6,441,823 B1 * | 8/2002 | Ananya | G06T 11/203 | 345/442 |
| 6,625,135 B1 * | 9/2003 | Johnson | H04W 16/18 | 370/332 |
| 7,268,782 B2 * | 9/2007 | Ebert | G06Q 10/06 | 345/440 |
| 7,606,168 B2 * | 10/2009 | Robinson | G06Q 10/10 | 370/254 |
| 7,984,389 B2 * | 7/2011 | Rusu | G06F 3/0481 | 715/855 |
| 8,489,588 B2 * | 7/2013 | Figueroa | G06F 16/44 | 707/726 |
| 9,111,390 B2 * | 8/2015 | Soshin | G06T 11/206 | |
| 9,329,756 B2 * | 5/2016 | Antipa | G06F 3/04845 | |
| 9,443,334 B2 * | 9/2016 | Nachmanson | G06T 11/206 | |
| 9,740,368 B1 * | 8/2017 | Love | G06F 3/04842 | |
| 9,773,329 B2 * | 9/2017 | Borley | G06T 11/206 | |
| 9,836,183 B1 * | 12/2017 | Love | G06T 11/206 | |
| 10,269,150 B1 * | 4/2019 | Stringham | G06T 11/20 | |
| 10,365,791 B2 * | 7/2019 | Spaulding | G06F 3/04842 | |
| 10,373,354 B2 * | 8/2019 | Barosi | G06Q 10/067 | |
| 2002/0196292 A1 * | 12/2002 | Itoh | G06T 11/206 | 715/853 |
| 2003/0156123 A1 * | 8/2003 | Steed | G06T 11/203 | 345/619 |
| 2004/0095351 A1 * | 5/2004 | Ananya | G06T 11/203 | 345/442 |
| 2005/0212806 A1 * | 9/2005 | Koselj | G06T 11/203 | 345/522 |
| 2007/0132767 A1 * | 6/2007 | Wright | G06K 9/00771 | 345/475 |
| 2008/0052628 A1 * | 2/2008 | Bugenhagen | H04L 41/0896 | 715/736 |
| 2010/0060642 A1 * | 3/2010 | Chhaparwal | G06T 11/206 | 345/440 |
| 2010/0185984 A1 * | 7/2010 | Wright | G06T 11/206 | 715/833 |
| 2011/0181595 A1 * | 7/2011 | Nachmanson | G06T 11/20 | 345/440 |
| 2011/0279455 A1 * | 11/2011 | McDaniel | G06T 19/20 | 345/427 |
| 2012/0054226 A1 * | 3/2012 | Cao | G06F 16/34 | 707/769 |
| 2013/0018636 A1 * | 1/2013 | Ruf | G06F 17/17 | 703/2 |
| 2013/0246958 A1 * | 9/2013 | Dwyer | G06T 11/206 | 715/771 |
| 2013/0278594 A1 * | 10/2013 | Kaatz | G06T 11/203 | 345/419 |
| 2014/0132623 A1 * | 5/2014 | Holten | G06T 11/206 | 345/593 |
| 2014/0230030 A1 * | 8/2014 | Abhyanker | H04L 63/107 | 726/6 |
| 2014/0253556 A1 * | 9/2014 | Riche | G06T 11/206 | 345/440 |
| 2015/0220535 A1 * | 8/2015 | Palmer | G06F 16/34 | 707/749 |
| 2015/0325016 A1 * | 11/2015 | Carr | G06T 11/206 | 345/442 |
| 2015/0339835 A1 * | 11/2015 | Mohr | G06T 11/206 | 345/440 |
| 2016/0012152 A1 * | 1/2016 | Johnson | G06F 16/9024 | 707/798 |
| 2016/0155251 A1 * | 6/2016 | Borley | G06T 11/206 | 345/440 |
| 2016/0156508 A1 * | 6/2016 | Kim | H04L 41/22 | 709/220 |
| 2016/0163068 A1 * | 6/2016 | Uemura | G06T 17/30 | 382/286 |
| 2016/0219071 A1 * | 7/2016 | Vasseur | H04L 63/1425 | |
| 2016/0357416 A1 * | 12/2016 | Abuduweili | G06F 3/04845 | |
| 2017/0024886 A1 * | 1/2017 | Dickrell, III | G01N 21/00 | |
| 2017/0078153 A1 * | 3/2017 | Zhang | H04L 41/12 | |
| 2017/0111236 A1 * | 4/2017 | Bielenberg | H04L 41/22 | |
| 2017/0316599 A1 * | 11/2017 | Giunio-Zorkin | G06F 16/387 | |
| 2018/0067630 A1 * | 3/2018 | Jaramillo | G06F 3/04845 | |
| 2018/0246988 A1 * | 8/2018 | Johnson | G06F 16/9038 | |

* cited by examiner

BEFORE — 802

AFTER — 804

SYSTEMS AND METHODS FOR ELECTRON FLOW RENDERING AND VISUALIZATION CORRECTION

CROSS REFERENCE TO RELATED APPLICATION

This application claims priority to U.S. Provisional Application No. 62/548,610, filed Aug. 22, 2017, and titled SYSTEMS AND METHODS FOR ELECTRON FLOW RENDERING AND VISUALIZATION CORRECTION, the content of which is incorporated herein by reference in its entirety.

TECHNICAL FIELD

The presently disclosed subject matter relates generally to visualization of data flow. Particularly, the presently disclosed subject matter relates to systems and methods for rendering electron flow correction.

BACKGROUND

Many software developers and computer network professionals utilize current data flow visualization systems in order to generate a graphical rendering presentation of how data flows between devices connected within a shared network. A significant number of devices may be connected within a shared network, including network hubs, routers, servers and other networking infrastructure devices. Network professionals often need accurate information as to how these devices receive and transmit data between them in order to increase network efficiency, bandwidth, robustability, and to reduce latency effects due to various network related factors. By using current data flow visualization systems, network professionals may visually understand how the given network is configured and how the data is being traversed and transmitted throughout the given network and related devices.

However, when multiple devices are connected and traversing among the network, the rendered line segments representing the data flow between devices can cause unwanted collisions, which in turn produce inaccurate data flow rendering. For instance, if multiple line segments, which represent the data flow between a subset of device, are rendered and directed toward one device (i.e., a network hub) the rendered line segments may be bundled together which in turn inhibit the system to accurately display which data flow applies to which device. The current "one size fits all" technique for visualizing data flow produces inaccurate and inconsistent rendering of embodiments pertaining to the data and network flow between devices.

In view of the foregoing, there is a continuing need for improved techniques for electron flow rendering and correction.

BRIEF DESCRIPTION OF THE DRAWINGS

Figure 1:
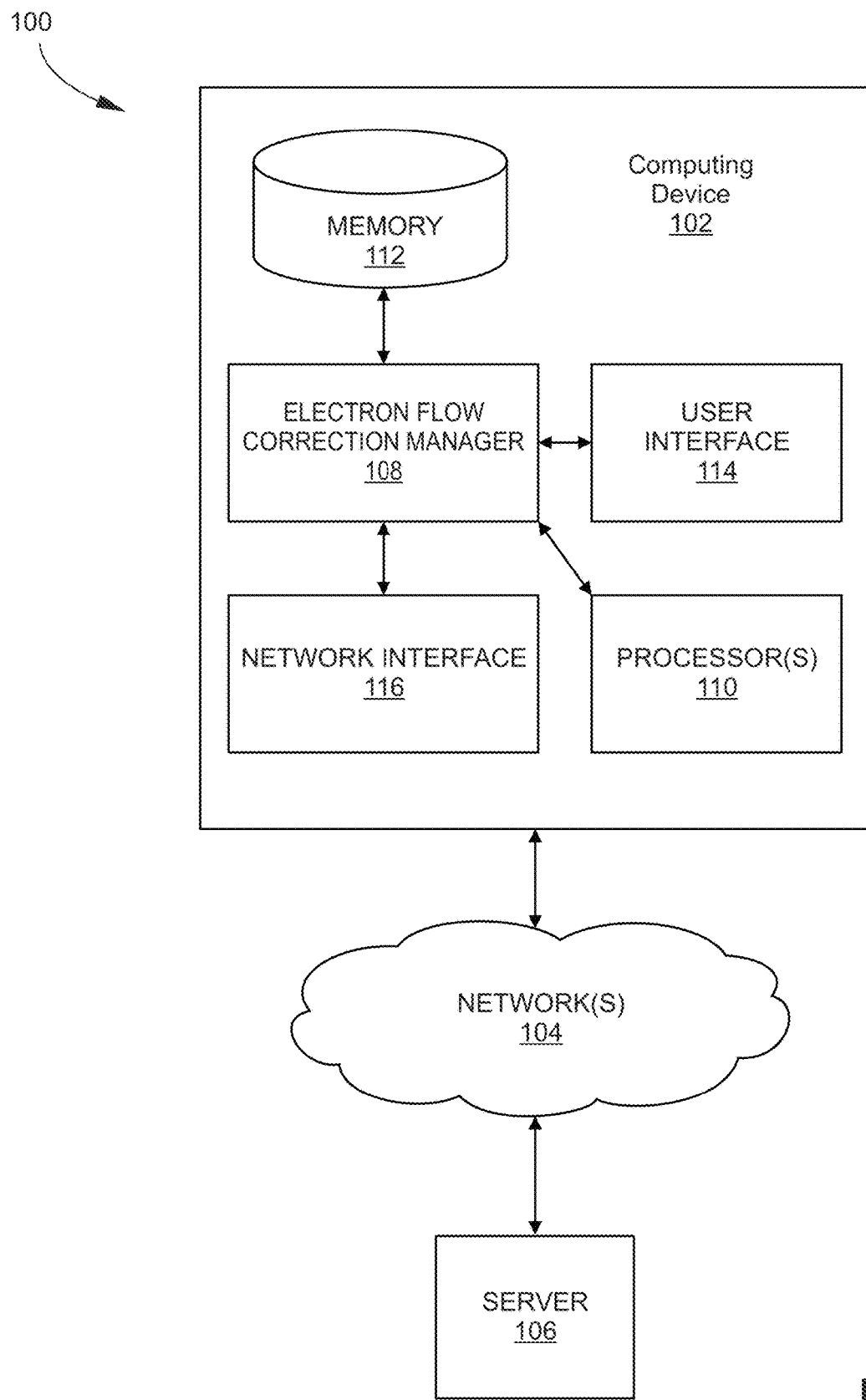
Figure 2:
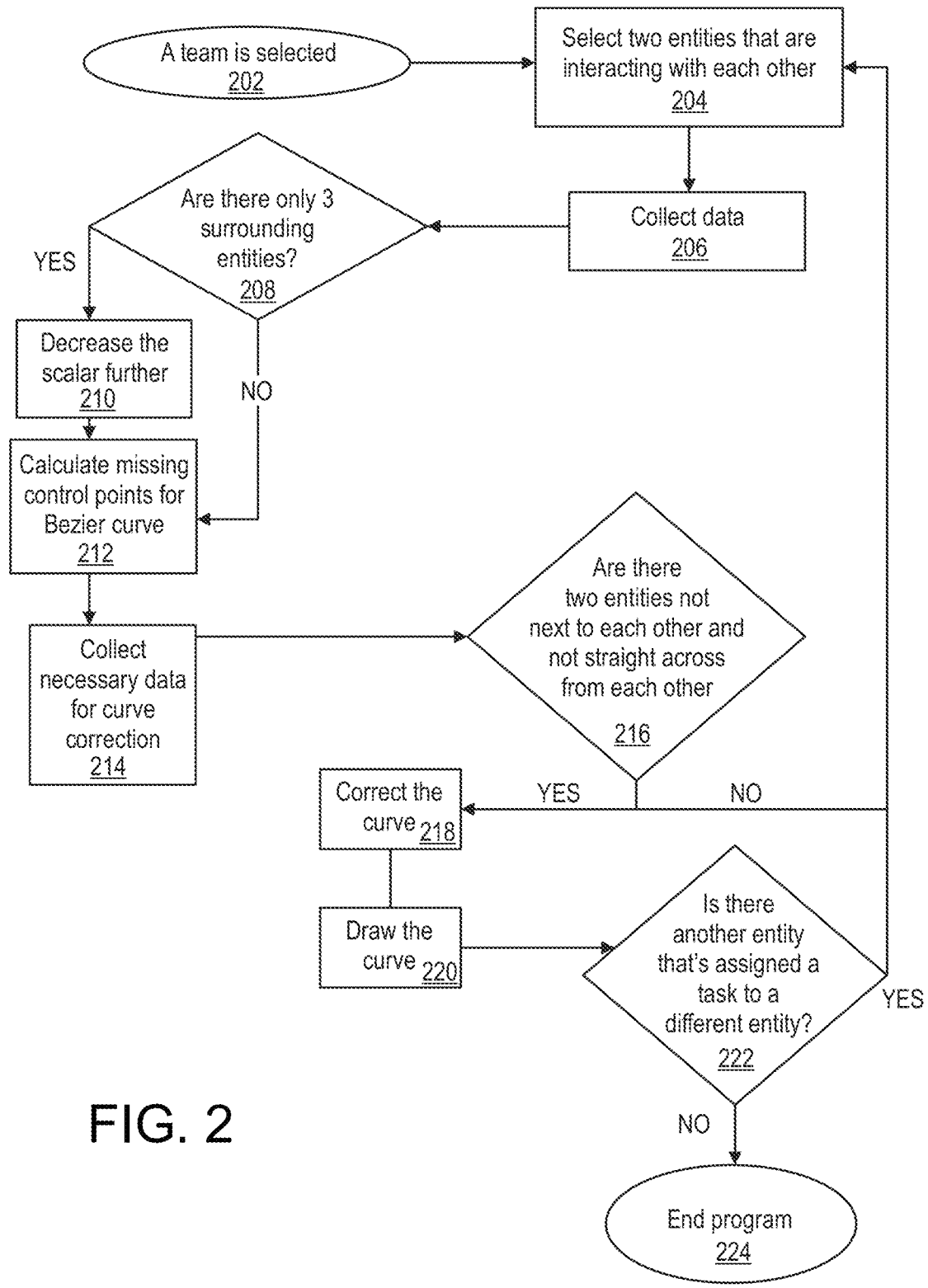
Figure 3:
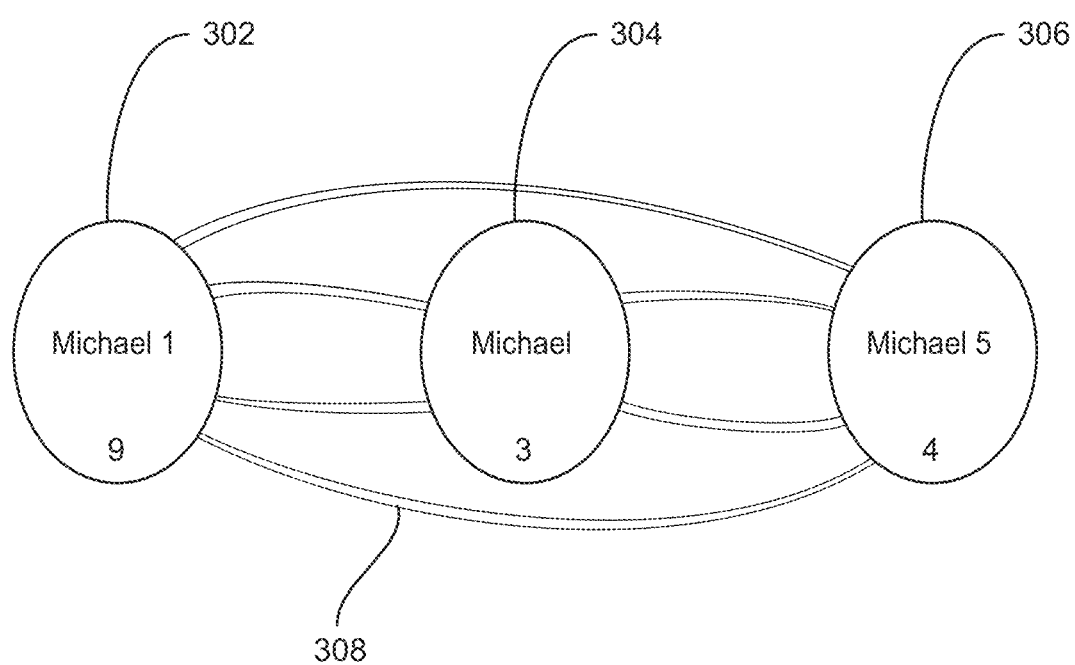
Figure 4:
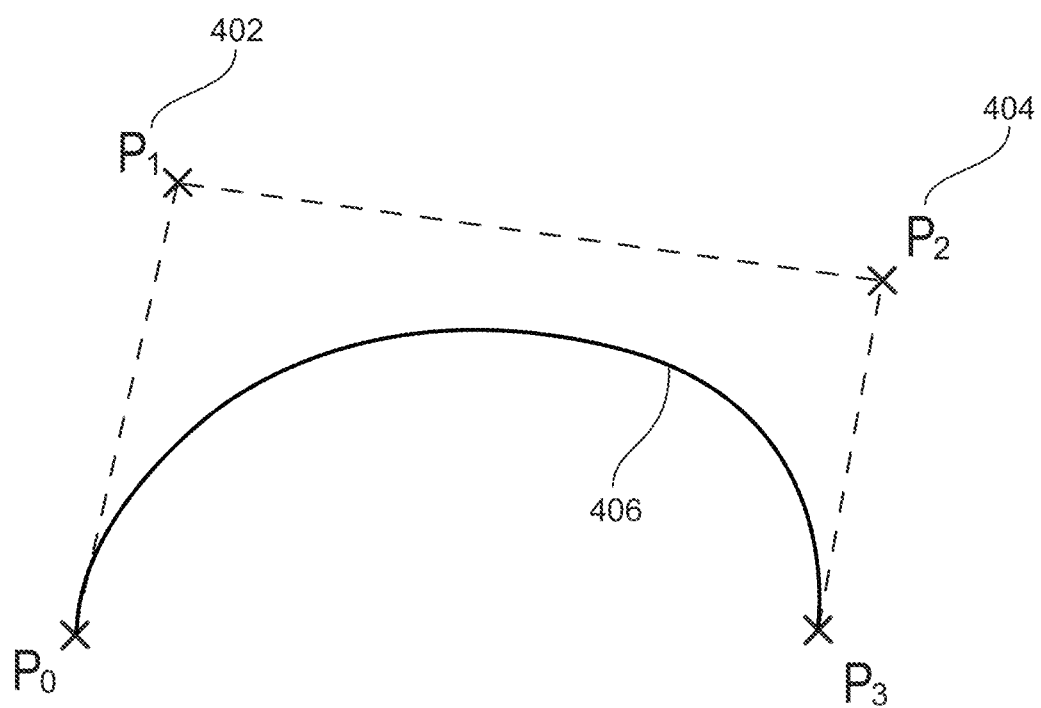
Figure 5:
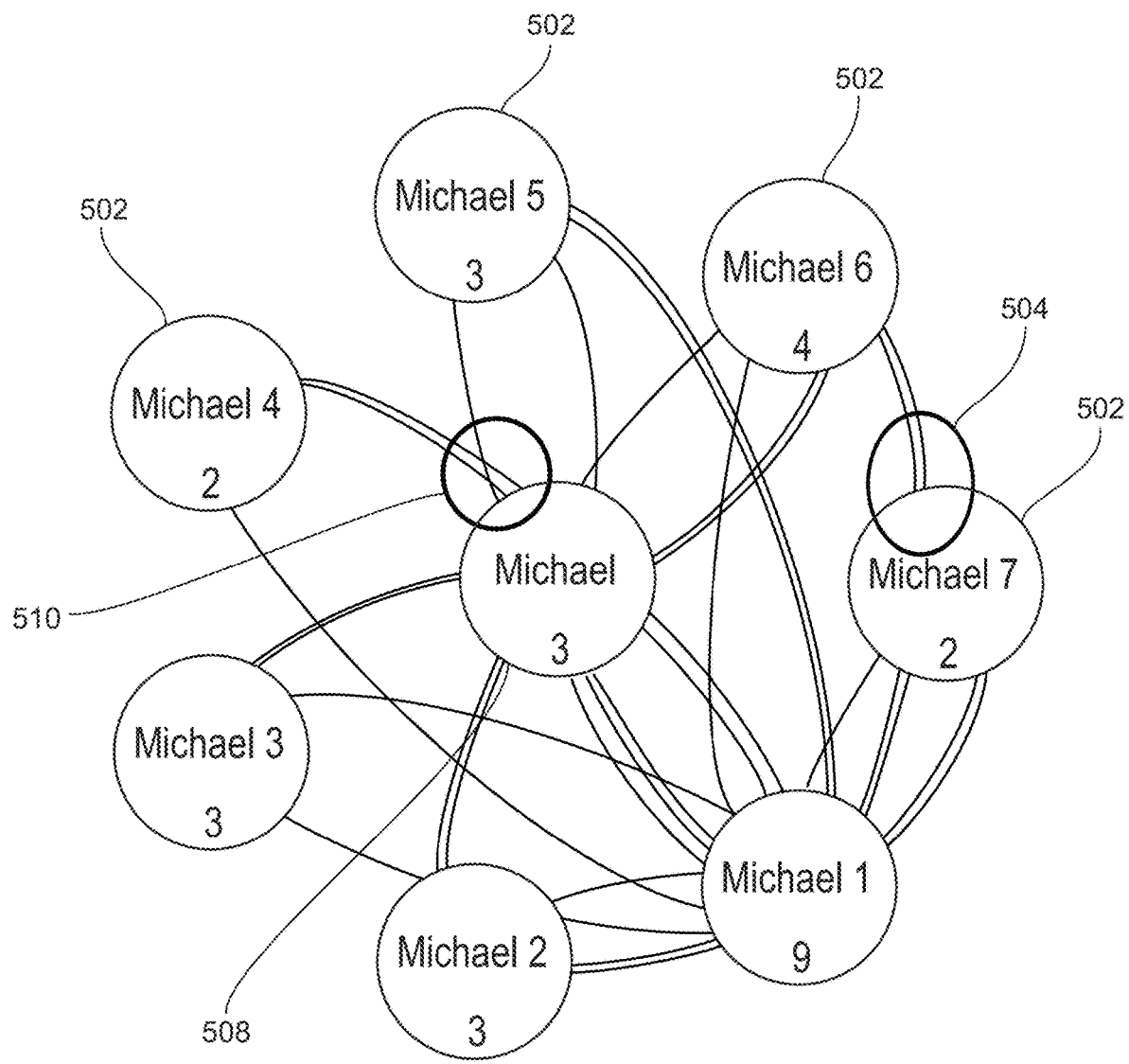
Figure 6:
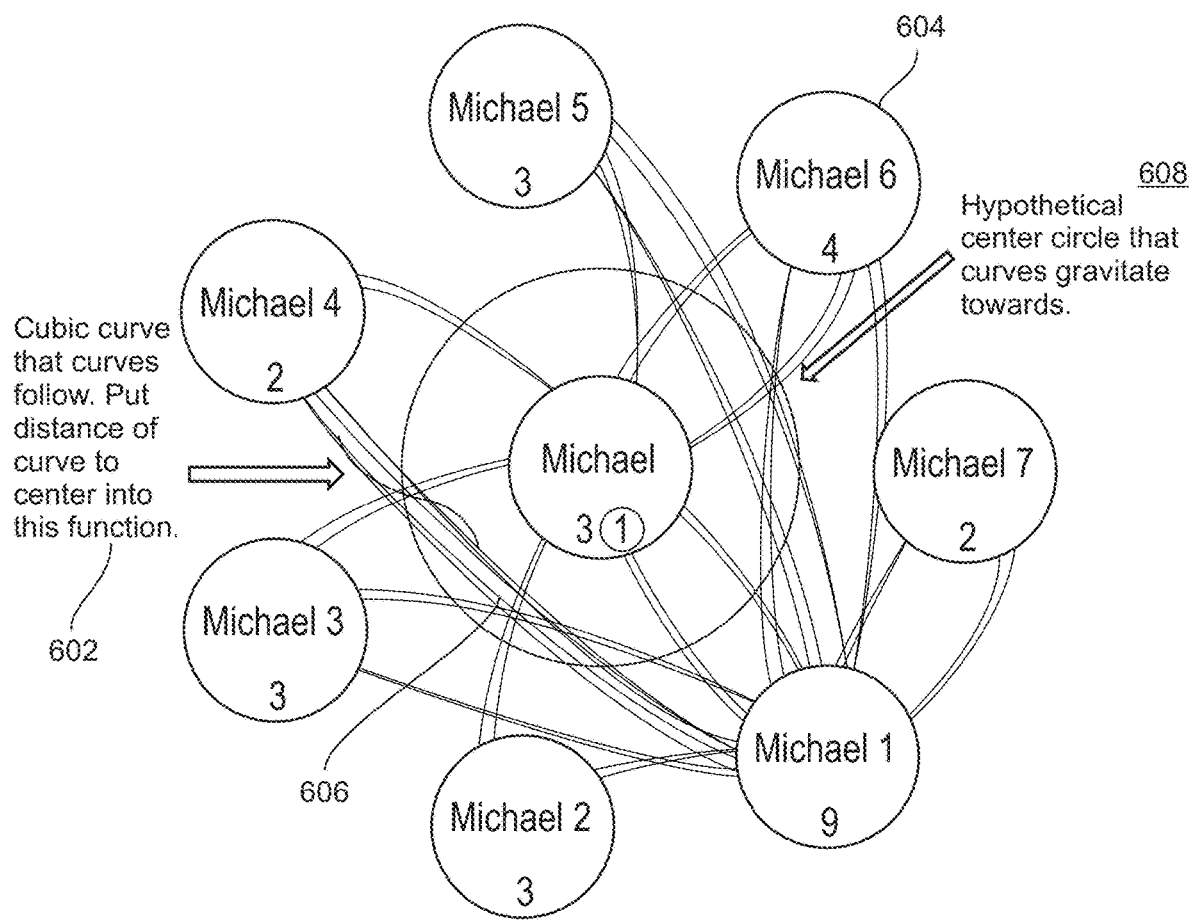
Figure 7:
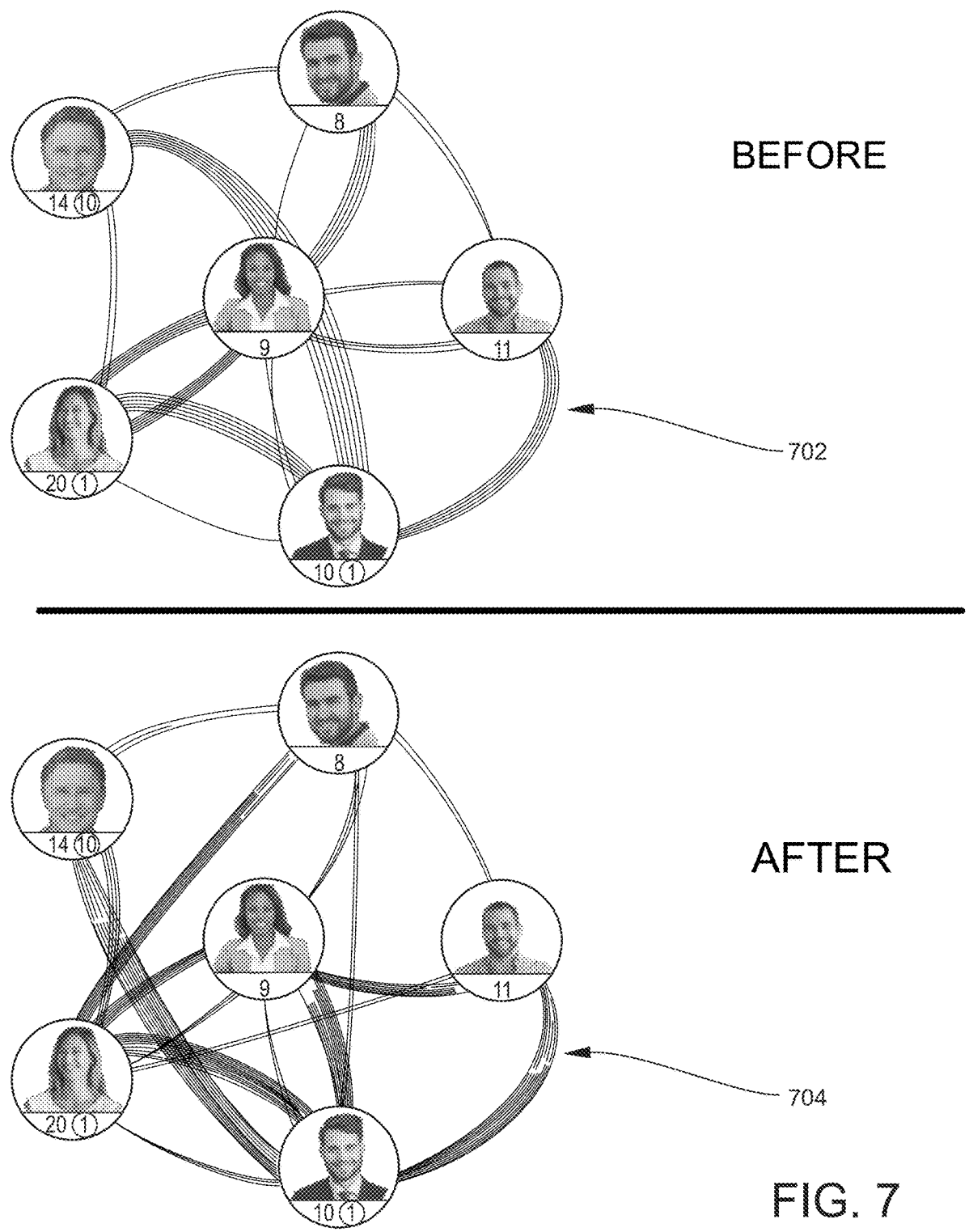
Figure 8:
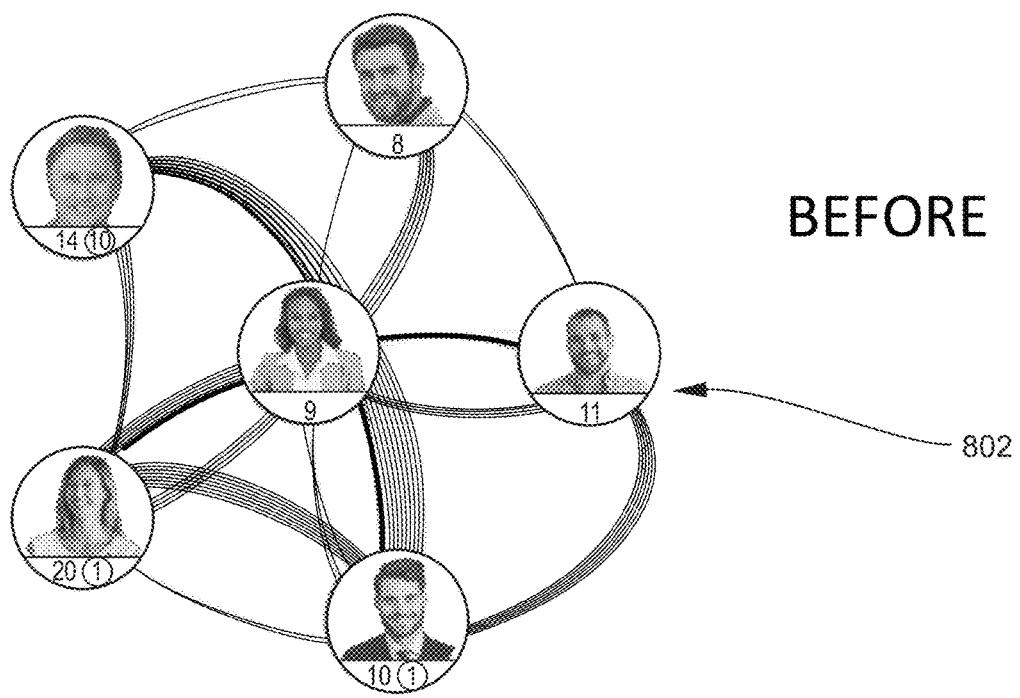
Figure 8:
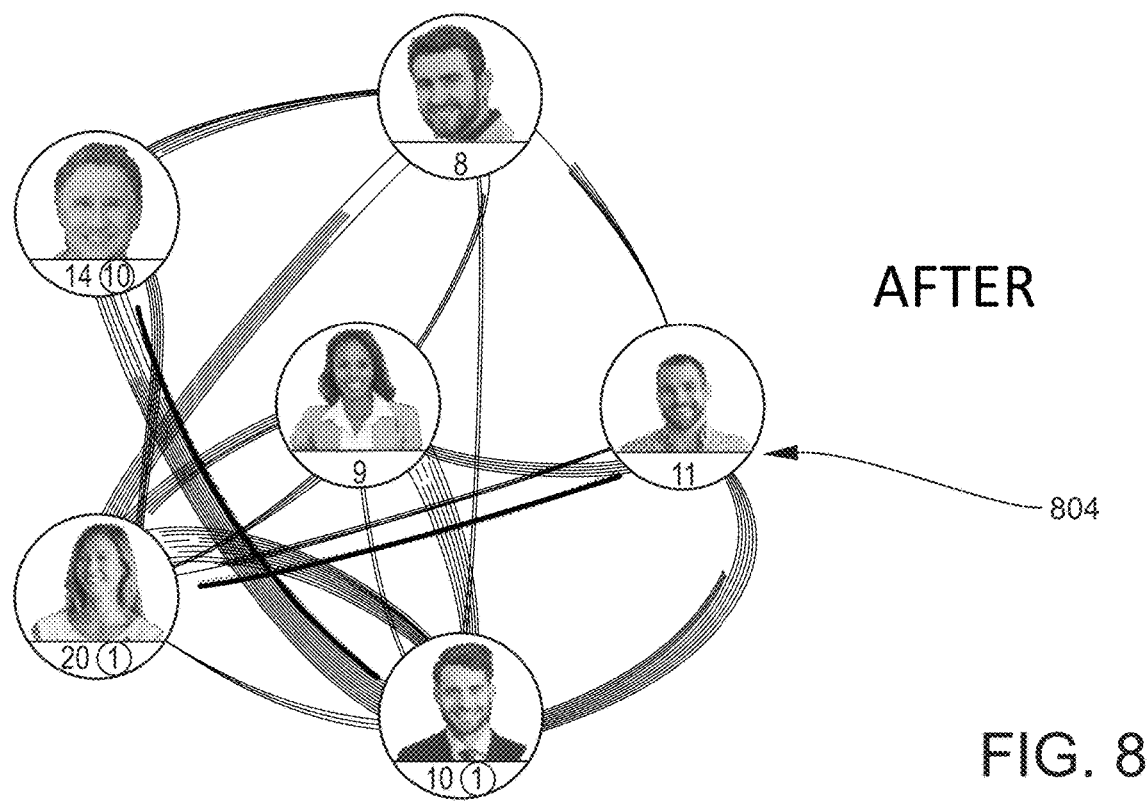
Figure 9A:
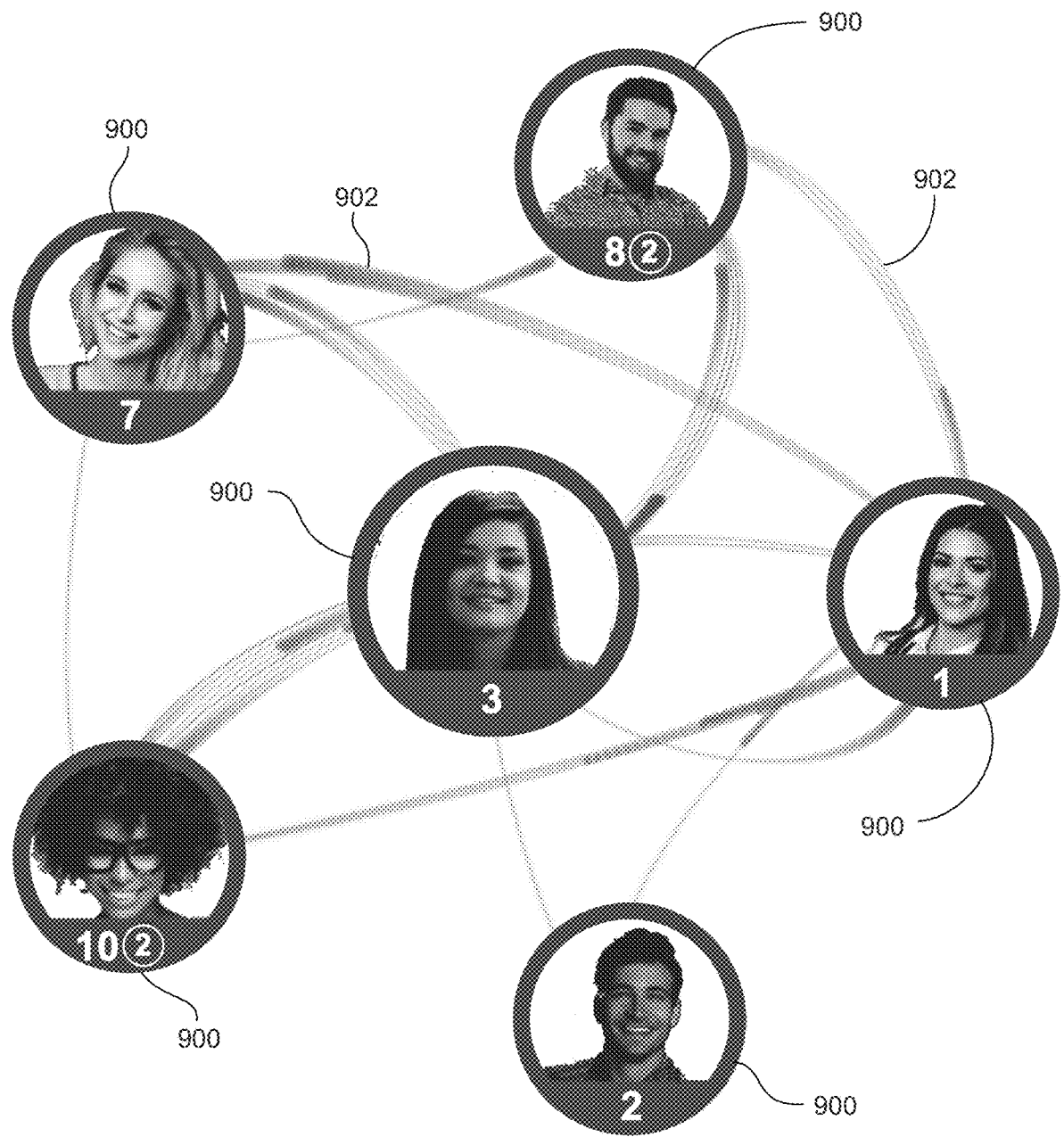
Figure 9B:
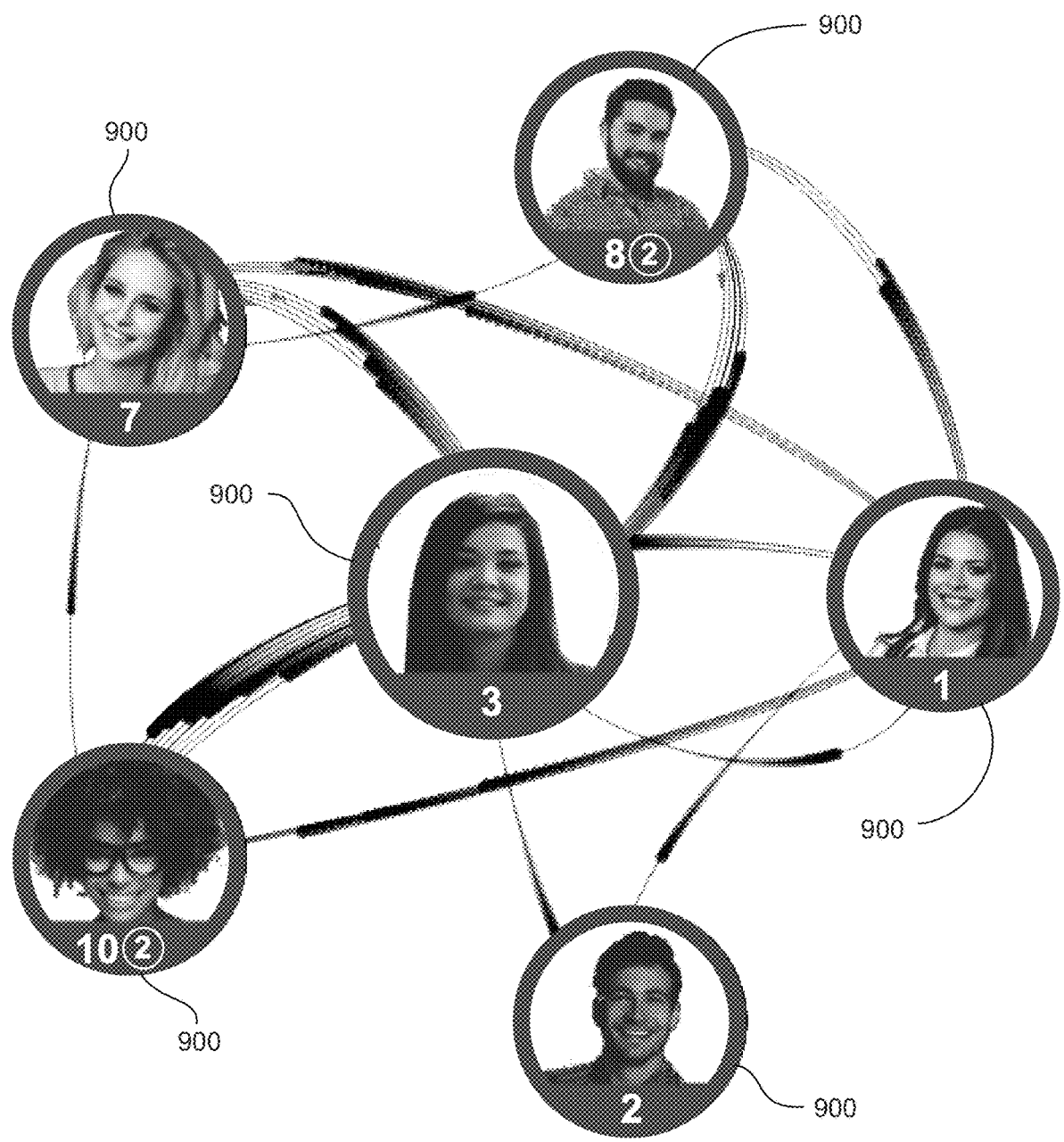
Figure 9C:
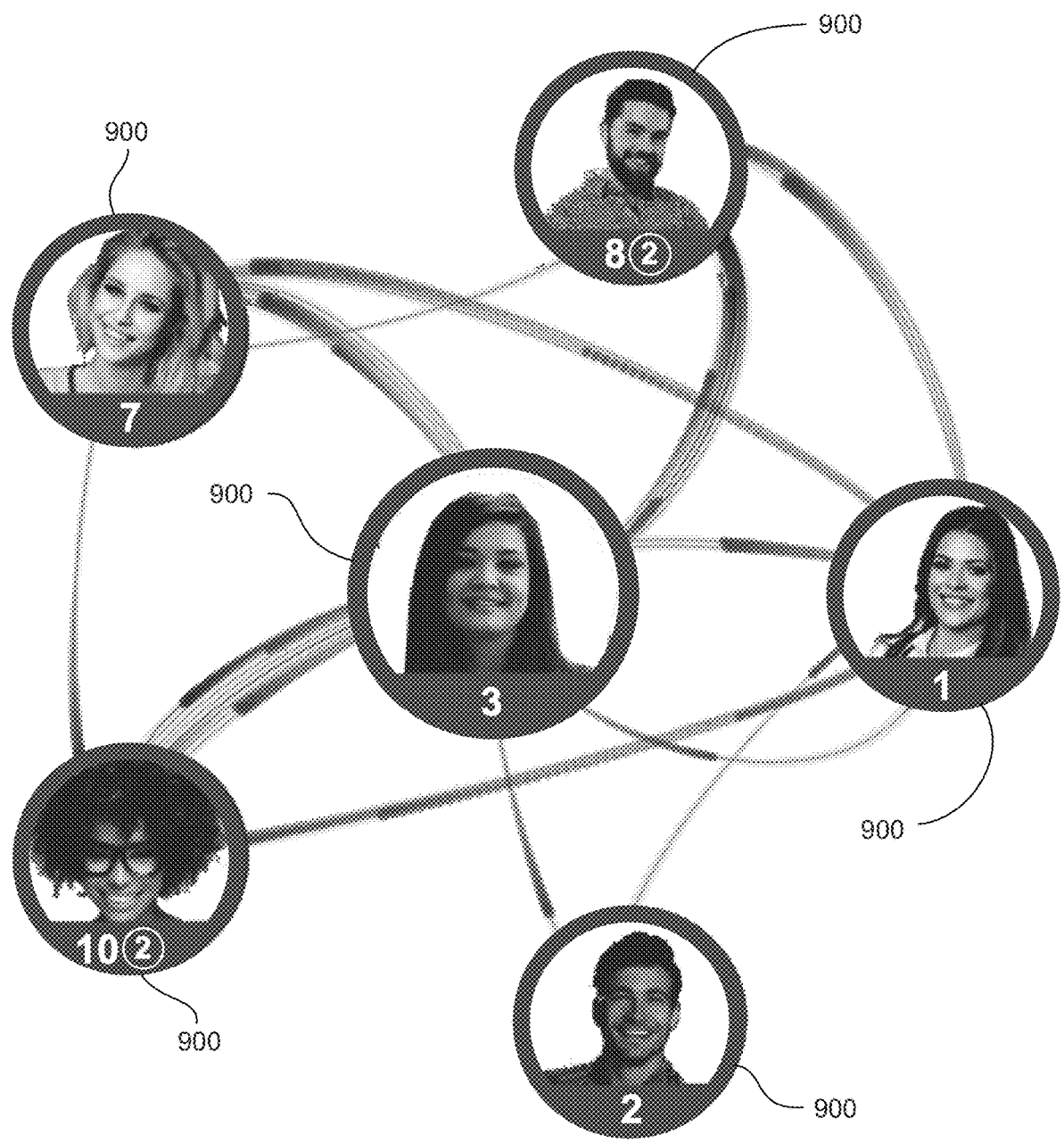

Having thus described the presently disclosed subject matter in general terms, reference will now be made to the accompanying Drawings, which are not necessarily drawn to scale, and wherein:

FIG. 1 is a block diagram of a system for electron flow rendering and visualization correction in accordance with embodiments of the present disclosure;

FIG. 2 is a flow chart of an example method for electron flow visualization correction in accordance with embodiments of the present disclosure;

FIG. 3 is a diagram depicting electron flow between three entities in accordance with embodiments of the present disclosure;

FIG. 4 is a diagram of an example Bezier curve with four points in accordance with embodiments of the present disclosure;

FIG. 5 is a diagram depicting electron flow between nine entities identifying electron flow collision in accordance with embodiments of the present disclosure;

FIG. 6 is a diagram depicting electron flow between nine entities executing the collision correction process as shown in FIG. 5 in accordance with embodiments of the present disclosure;

FIG. 7 are diagrams showing before and after rendering effects of an example collision correction process in accordance with embodiments of the present disclosure;

FIG. 8 are diagrams showing before and after rendering effects of an example collision correction process in accordance with embodiments of the present disclosure; and FIGS. 9A-9C are screenshots showing example electron flows between multiple entities in accordance with embodiments of the present disclosure.

SUMMARY

The presently disclosed subject matter provides systems and methods for electron flow rendering and visualization correction. According to an aspect, a method includes detecting two or more entities connected in a computing network. The method also includes acquiring data attributes from the entities connected to each other within the computing network. Further, the method includes rendering a graphical depiction of the entities connected to each other in the form of a graphical object and graphical line curvature. The method also includes generating a graphical line curvature correction scheme based on a relationship between the graphical line curvatures and graphical objects. Further, the method includes applying the graphical line curvature correction scheme to the acquired data attributes from the entities connected to each other in the form of graphical objects and graphical line curvatures to produce a corrected electron flow expression of the entities.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a BLACK-BERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, ROM and RAM.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

In accordance with embodiments, the presently disclosed subject matter can be used for correcting electron flow visualization. Particularly, systems and methods disclosed herein can correct Bezier curves inwards or outside from colliding line segments which represent a graphical representation of electron flow between entities connected in a computing network. The systems and methods disclosed herein may applied to, for example, computer network environments.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

As referred to herein, an "entity" can be an emulation of a computing device or computing system. An entity can be based on computing architectures and provide functionality of a physical computing device. Their implementations may involve specialized hardware, software, firmware, or combinations thereof. Entities may be a type of workload implemented and managed within a network. An image of an entity may contain an operating system (OS), data files, and applications. The data files may be of any suitable file type and have a directory structure.

In accordance with the present disclosure, FIG. 1 illustrates a block diagram of a system 100 for electron flow rendering and visualization correction in accordance with embodiments of the present disclosure. Referring to FIG. 1, the system 100 may be implemented in whole or in part in any suitable communication environment, such as one communicatively connected via one or more networks 104. The network(s) 104 may include the Internet and one or more wired or wireless networks as will be understood to those of skill in the art. The system 100 includes a computing device 102 communicatively connected to a server 106 via the network(s) 104.

The computing device 102 shown in FIG. 1 includes an electron flow correction manager 108 configured to implement functionality in accordance with embodiments of the present disclosure. For example, the electron flow correction manager 108 may be configured to detect two or more entities connected in a computing network. Further, the electron flow correction manager 108 may acquire data attributes from the entities connected to each other within the computing network. The electron flow correction manager 108 may render a graphical depiction of the two or more entities connected to each other in the form of a graphical object and graphical line curvature. Further, the electron flow correction manager 108 may generate a graphical line curvature correction scheme based on a relationship between the graphical line curvatures and graphical objects. The electron flow correction manager 108 may also apply the graphical line curvature correction scheme to the acquired data attributes from the two or more entities connected to each other in the form of graphical objects and graphical line curvatures to produce a corrected electron flow expression of the two or more entities. The electron flow correction manager 108 may be implemented by suitable hardware, software, firmware, or combinations thereof. For example, the electron flow correction manager 108 may entirely or partially be implemented by one or more processors 110 that implement instructions residing on memory 112.

The computing device 102 may be communicatively coupled to a user interface 114 and a network interface 116. In an example, the electron flow correction manager 108 may be an application that executes on the processor(s) 110 of the computing device 102. The processor(s) 110 may be a dual processor which includes a graphical processing unit (GPU) for rendering pixel frames of video data, three-dimensional ("3D") objects, two-dimensional ("2D") objects, 3D images, 2D images, and augmented reality images, icons, shapes, and line segments that can overlay over a model image, 3D model, or real-world scene and the like. The system 100 may include any number of computing devices configured to implement functionality in accordance with embodiments disclosed herein, although only one computing device 102 is shown in FIG. 1 for convenience of illustration.

The user interface 114 may include a keyboard device or touch display keyboard that enables a user of the device to activate the features according to the present disclosure. The user interface 114 may be rendered on a display (not shown) attached to the computing device 102. For example, the user interface 114 include a touchscreen display for displaying text and graphics and for receiving user input. The user interface 114 may be communicatively coupled to the computing device 102 via wireless or wireline elements.

FIG. 2 illustrates a flow chart of an example method for electron flow visualization correction in accordance with embodiments of the present disclosure. Referring to FIG. 2, an electron flow correction manager (e.g., the electron flow correction manager 108 shown in FIG. 1) may detect two or more entities 202, 204, and 206 connected via one or more networks (e.g., network(s) 104 shown in FIG. 1), acquire data attributes from the entities 202, 204, and 206, render a graphical depiction of the two or more entities connected to each other in the form of a graphical object and graphical line curvature, generate a graphical line curvature correction scheme based on a relationship between the graphical line curvatures and graphical objects, and apply the graphical line curvature correction scheme to the acquired data attributes from the entities connected to each other in the form of graphical objects and graphical line curvatures to produce a corrected electron flow expression of the entities. The electron flow correction manager may also detect two or more entities 302, 304, and 306 connected in a computing network, acquire data attributes from the entities 302, 304, and 306 connected to each other within the computing network; render a graphical depiction of the entities 302, 304, and 306 connected to each other in the form of a graphical object and graphical line curvature (e.g., graphical line curvature 308); generate a graphical line curvature correction scheme based on a relationship between the graphical line curvatures and graphical objects; and apply the graphical line curvature correction scheme to the acquired data attributes from the entities connected to each other in the form of graphical objects and graphical line curvatures to produce a corrected electron flow expression of the entities 302, 304, and 306. The electron flow correction manager may also determine if there are only three surrounding computing entities 202, 204, and 206. In the scenario of only 3 surrounding entities, a command may be initiated by the electron flow correction manager to further decrease the scalar value. The electron flow correction manager 108 may execute a test for determining whether entities 202, 204, and 206 are not next to each other for correction. But in this special case, all entities 202, 204, and 206 are technically next to each other, thus, correction may occur by decreasing the scalar by a value greater than the current scalar value, thus, making the curves thinner.

The electron flow correction manager 108 may also calculate missing control points for a Bezier curve by adding (−dy) to each X value of the entity points and dx to each Y value of the entity points and by creating two new points. By calculating the missing control points for Bezier curve, the points are shifted out along the perpendicular slope, thus ensuring depth in each curve and retaining direction dependency. As a result, when entities 202, 204, 206, and 814 send tasks to each other, rendering overlapping curves and size scaling based on distance will be improved. This is an improved feature for wrapping around the central entity. The electron flow correction manager may receive and/or collect necessary data for curve correction by acquiring the radius from the central entity 408 and 506 to any surrounding entity 504 and the distance between the two entities, and then calculating the radians of separation using the Law of Cosines through the following: ACOS (1−0.5*distance*distance/radius/radius). Further, the calculation may include collecting the estimated maximum for the curve, which may be estimated to be the average of all four Bezier curve points.

FIG. 2 illustrates a flow chart of an example method for electron flow visualization correction in accordance with the present disclosure. Referring to FIG. 2, the method includes detecting two or more entities connected in a computing network; acquiring data attributes from the entities connected to each other within the computing network; rendering a graphical depiction of the entities connected to each other in the form of a graphical object and graphical line curvature; generating a graphical line curvature correction scheme based on a relationship between the graphical line curvatures and graphical objects; and applying the graphical line curvature correction scheme to the acquired data attributes from the entities connected to each other in the form of graphical objects and graphical line curvatures to produce a corrected electron flow expression of the entities. The method may be implemented, for example, by the electron flow correction manager 108 shown in FIG. 1, although it should be understood that the method may be implemented by any suitable computing device or devices.

With continuing reference to FIG. 2, at block 202 a team is selected, and all entities in the team may be presented to a user. For example, the user interface 114 shown in FIG. 1 may be used by a user to select members (or entities) of the team. Further, a display of the user interface 114 may display a graphical representation of each entity of the team. Each entity may correspond to any type of computing device. A central entity with other circling entities may also be selected.

The method of FIG. 2 also includes selecting 204 two entities that are interacting with each other. At block 106, the method includes collecting data. For example, the collected data may include the X and Y values of each entity for which the curve correction is being calculated. Further, the method includes calculating a change in X (dx) and change in Y (dy). Accordingly, the method multiplies dx and dy by a predefined scalar for stylistic purposes (for making the curve bigger/smaller based on aesthetic value). The method may also include collecting the number of surrounding entities. Subsequently, at block 208, the method includes determining whether there are only three surrounding entities. If it is determined that there are only 3 surrounding entities, the method proceeds to block 210 where a command is given to decrease the scalar value further. As described in further detail herein, a test may be executed in order to determine whether entities are not next to each other for correction, but in this particular case, all entities are technically next to each other. Curve correction in this case may be done by decreasing the scalar further, making curves thinner. If it is determined that there are not only 3 surrounding entities, the method proceeds to block 212.

At block 212 of FIG. 2, the method includes calculating missing control points for Bezier curve. The missing control point may be calculated by adding (−dy) to each X value of the entity points and dx to each Y value of the entity points and by creating two new points. This method effectively shifts the points out along the perpendicular slope, ensuring depth for the curve, as well as retaining direction dependency (so entities sending tasks to each other will not have overlapping curves) and size scaling based on distance, which can be important in wrapping around the central entity.

At block 214 of FIG. 2, the method includes collecting data for curve correction. For example, the method may include acquiring the radius from the central entity to any surrounding entity and the distance between the two entities, and subsequently calculating the radians of separation using the Law of Cosines through the following: ACOS (1−0.5*distance*distance/radius/radius). Further, the calculation may include collecting the estimated maximum for the curve, which may be estimated to be the average of all four Bezier curve points.

With continuing reference to FIG. 2, the method includes determining 216 whether there are two entities not next to each other and not straight across from each other (i.e., whether they need to be corrected). If yes at block 216, the method proceeds to block 218. Otherwise, if no at block 216, the method returns to block 204. If the radians of separation equals 2π/(# of surrounding entities), then they are next to each other. If distance=2*radius, they are straight across from each other. If the two entities are not next to each other and not straight across from each other, the method draws the curve 220. However, two entities are next to each other, a curve correction calculation (e.g., graphical line curvature correction scheme) is implemented at block 218. For instance, one advantage of the present disclosure is to pull curves inwards away from the outside to avoid outside entities and outwards away from the center entity. To do this, the curves gravitate towards a "central ring," or in other words, a central entity that acts as a hypothetical location for curves to gravitate towards. The curve correction or graphical line curvature correction scheme can calculate an odd function centered at the central ring that would be less than the full distance from the curve to the point so that curves are not all pulled exactly to that point. The function (−(distance from curve maximum to center)/mainRadius)+0.5)^3 may also be used. This function can determine the distance the curve needs to travel.

The Euclidian definition of a circle may also be used along with the perpendicular slope of the entities (this may point towards the center of the circle, thus always shifting towards the central ring) to shift the curve by the following steps: adding the value of this function divided by sqrt(1+slope*slope) to the X value of each control point and add slope*functionValue/sqrt(1+slope*slope) to the Y of each control point. Note that this example technique is direction independent, thus, in order to keep direction dependency as described above, the curve is to the right or left of the center of the circle and is either added or subtracted accordingly.

If the perpendicular slope is undefined, an adding/subtracting function may be executed on the Y values based on whether the curve is below/above the center of the circle. After the curve correction step 218, the method includes drawing 120 a curve. Subsequently, the method proceeds to determining 222 whether there is another entity that is assigned a task to a different entity. If no at block 222, the program ends 124. If yes at block 222, the method returns to block 204.

FIG. 3 illustrates a diagram depicting electron flow between three entities in accordance with embodiments of the present disclosure. Referring to FIG. 3, three entities 302, 304, and 306 may be entities processed in accordance with the method of FIG. 2. This depiction may be displayed on a display, such as one implemented by the user interface 114 shown in FIG. 1. Entities 302, 304, and 306 may also correspond to a rendering of a graphical depiction of the two or more entities 302, 304, and 306 connected to each other in the form of a graphical object and graphical line curvature 308. The graphical line curvature 308 may be drawn as Bezier curves. The Bezier curve points may be calculated by taking the perpendicular slope of the line between the two points and extending the Bezier curve along that line.

FIG. 4 illustrates a diagram of an example Bezier curve with four points in accordance with embodiments of the present disclosure. Referring to FIG. 4, the Bezier curve 406 is calculated by using two hypothetical points 402 and 404 (P1 and P2) to influence the curve 406. The method may execute a perpendicular shift to the points 402 and 404, thus the curve may always extend outwards. The curve 406 may extend proportionally relative to distance of the points 402 and 404, thus being able to attain the corrected curvature effect.

FIG. 5 illustrates a diagram depicting electron flow between nine entities identifying electron flow collision in accordance with embodiments of the present disclosure. This depiction may be displayed on a display, such as one implemented by the user interface 114 shown in FIG. 1. Referring to FIG. 5, the entities 502, circle a central entity 508. The graphical line curvatures 510 show an unwarranted collision among multiple graphical line curvatures 510 which represent the electron flow between entities 502. As shown in FIG. 5, there is a need to alter the curves 510 that are not next to each other and are not across from each other, since these curves may not collide with a different user or entity. As explain above, the Law of Cosines is utilized in order to find the angle of separation since the radius of the outer circle and the distance between the two users is known.

The result may determine whether the users are next to each other along the outer circle. FIG. 6 illustrates a diagram depicting electron flow between nine entities executing the collision correction process as shown in FIG. 5 in accordance with embodiments of the present disclosure. The central entity 606 is surrounded by entities 604. As shown in FIG. 6, the collision correction process pulls the curve towards an imaginary the middle circle 606 making sure curves 602 do not collide with the middle user or edge users. This is accomplished by plugging in the distance from the estimated curve maximum to the circle's center into a cubic function, pulling curves somewhat to the "middle circle 606." FIGS. 7 and 8 illustrate a visualization rendering of electron flow depicting the before and after rendering effects of the collision correction process in accordance with the present disclosure.

As shown in FIGS. 7 and 8, the before sample section 702 and 802 are shown and the middle circle entity and surrounding entities are further shown. The after-sample sections 704 and 804 further illustrate the corrected graphical line curvatures after the step of applying the graphical line curvature correction scheme to the acquired data attributes from the two or more entities connected to each other in the form of graphical objects and graphical line curvatures are executed to produce a corrected electron flow expression of the two or more entities.

FIGS. 9A-9C are screenshots showing example electron flows between multiple entities 900 in accordance with embodiments of the present disclosure. The progression of electron flow in this example begins at FIG. 9A and continues to the depiction in FIG. 9B, and finally the example ends at FIG. 9C. Lines 902 connect the entities 900. In this example, the lines (or electron flow paths) are shown in varying shades of gray according to a grayscale conversion of color. For example, darker shades of gray represent darker colors, and conversely, lighter shades of gray represent lighter colors. When on a screen display of a computing device, the different shades can move between entities 900 to indicate the flow of a task or tasks from one entity 900 to another. Further, for example, such movement can depict task activity between teammates, pictures of which are shown in this example. Each electron flow path represents one task. The direction of movement of colors (or shades of gray) between entities 900 indicates task assignment. In an example, one color (e.g., "purple electrons" or shade of gray) can indicate outstanding tasks. In another example, another color (e.g., "red electrons" or shade of gray) can indicate overdue tasks. In another example, an entity 900 outlined in another color (e.g., "blue" or shade of gray) can indicate a teammate from outside the group or enterprise.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A method comprising:
    at a computing device comprising at least one processor and memory:
    detecting two or more entities connected in a computing network;
    acquiring data attributes from the two or more entities connected to each other within the computing network;
    rendering a graphical depiction of the two or more entities connected to each other in the form of a graphical object and graphical line curvature;
    determining whether there are two entities among the two or more entities that are not next to each other and not straight across from each other; and
    in response to determining that there are two entities among the two or more entities that are not next to each other and not straight across from each other:
        generating a single central ring within a portion of the graphical depiction of the two entities that are not next to each other and not straight across from each other, wherein the central ring is less than the full distance from the graphical line curvature to a point positioned at the middle of the central ring, and wherein the central ring encompasses at least one other entity other than the two entities;
        generating a graphical line curvature correction scheme based on the graphical line curvature being pulled towards the central ring but not to the point positioned at the middle of the central ring, wherein the graphical line curvature correction scheme utilizes control points and the central ring to form a curve for a corrected electron flow expression between the two entities and avoids collisions with other entities; and
        applying the graphical line curvature correction scheme to the acquired data attributes from the two or more entities connected to each other in the form of graphical objects and graphical line curvature to produce a corrected electron flow expression of the two entities that are not next to each other and not straight across from each other.

2. The method of claim 1, wherein each of the two or more entities comprises a computing device, a network interface, a network hub, and a switch.

3. The method of claim 1, wherein the graphical line curvature comprises Bezier curves.

4. The method of claim 1, wherein generating a graphical line curvature correction scheme comprises:
    identifying a central entity among the two or more entities;
    receiving a plurality of (x) values and a plurality of (y) values from the two or more entities;
    calculating a change in coordinate value of at least one of the received (x) value and a change in coordinate value of at least one of the received (y) value; and
    multiplying the change in coordinate value of the at least one of the received (x) value and the change of coordinate value of the at least one of the received (y) value with a predetermined scalar value.

5. The method of claim 4, wherein generating a graphical line curvature correction scheme comprises acquiring a number of surrounding entities within the computing network.

6. The method of claim 4, wherein generating a graphical line curvature correction scheme comprises calculating a missing control point for the graphical line curvature.

7. The method of claim 6, wherein calculating a missing control point for the graphical line curvature comprises adding the change in coordinate value of the plurality of (y) values to each of the at least one of the received (x) value and the change in coordinate value of the plurality of (x) values to each of the at least one of the received (y) value.

8. The method of claim 5, wherein acquiring data attributes from the two or more entities connected to each other within the computing network further comprises:
    determining the radius of a central entity among the two or more entities within the computing network; and
    calculating the difference between the determined radius of the central entity and a distance between the two or more entities connected to each other.

9. The method of claim 1, further comprising using a display to display the two or more entities, the graphical line curvature, and the graphical objects.

10. The method of claim 1, wherein the two or more entities are associated with computing devices communicatively connected via the computing network.

11. A system comprising:
    a processor; and
    a memory, wherein, the memory stores an electron flow correction manager, the electron flow correction manager is executed by the processor and includes instructions to:
        detect two or more entities connected within a computing network;
        acquire data attributes from the two or more entities connected to each other within the computing network;
        render a graphical depiction of the two or more entities connected to each other in the form of a graphical object and graphical line curvature;
        determine whether there are two entities among the two or more entities that are not next to each other and not straight across from each other; and
        in response to determining that there are two entities among the two or more entities that are not next to each other and not straight across from each other:
            generate a single central ring within a portion of the graphical depiction of the two entities that are not next to each other and not straight across from each other, wherein the central ring is less than the full distance from the graphical line curvatures to a point positioned at the middle of the central ring, and wherein the central ring encompasses at least one other entity other than the two entities;
            generate a graphical line curvature correction scheme based on the graphical line curvatures being pulled towards the central ring but not to the point positioned at the middle of the central ring, wherein the graphical line curvature correction scheme utilizes control points and the central ring to form a curve for a corrected electron flow expression between the two entities and avoids collisions with other entities; and apply the graphical line curvature correction scheme to the acquired data attributes from the two or more entities connected to each other in the form of graphical objects and graphical line curvature to produce a corrected electron flow expression of the two entities that are not next to each other and not straight across from each other.

12. The system of claim 11, wherein each of the two or more entities comprises a computing device, a network interface, a network hub, and a switch.

13. The system of claim 11, wherein the graphical line curvature comprises Bezier curves.

14. The system of claim 11, wherein the electron flow correction manager is configured to:

generate a graphical line curvature correction scheme based on the relationship between the graphical line curvatures and graphical objects further comprises:

identify a central entity among the two or more entities;

receive a plurality of (x) values and a plurality of (y) values from the two or more entities;

calculate a change in coordinate value of at least one of the received (x) value and a change in coordinate value of at least one of the received (y) value; and multiply the change in coordinate value of the at least one of the received (x) value and the change of coordinate value of the at least one of the received (y) value with a predetermined scalar value.

15. The system of claim 14, wherein the electron flow correction manager is further configured to acquire a number of surrounding entities within the computing network.

16. The system of claim 14, wherein the electron flow correction manager is further configured to calculate a missing control point for the graphical line curvature.

17. The system of claim 16, wherein the electron flow correction manager is further configured to add the change in coordinate value of the plurality of (y) values to each of the at least one of the received (x) value and the change in coordinate value of the plurality of (x) values to each of the at least one of the received (y) value.

18. The system of claim 11, wherein the electron flow correction manager is further configured to:

determine the radius of a central entity among the two or more entities within the computing network; and calculate the difference between the determined radius of the central entity and a distance between the two or more entities connected to each other.

19. The system of claim 11, further comprising a display configured to display the two or more entities, the graphical line curvatures, and the graphical objects.

20. The system of claim 11, wherein the two or more entities are associated with computing devices communicatively connected via the computing network.

* * * * *